March 11, 1958  JIRO MUKAI  2,826,116
PHOTOGRAPHIC OBJECTIVE CONSISTING OF FIVE LENS ELEMENTS
Filed May 23, 1956
FIG. 1
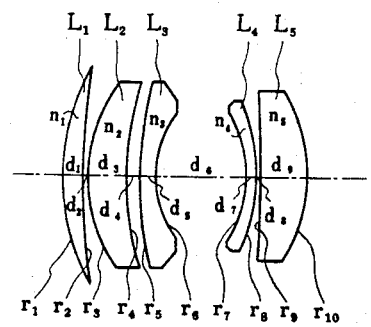
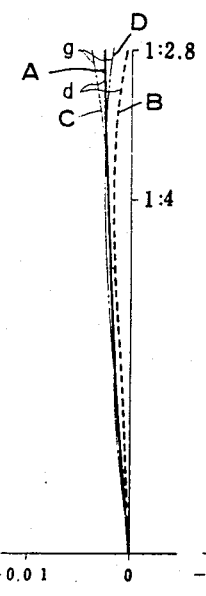
FIG. 2
SPHERICAL ABERRATION
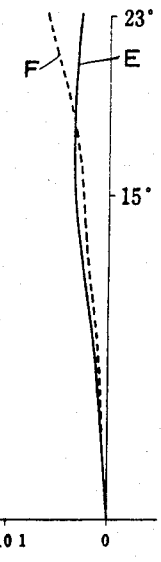
FIG. 3
ASTIGMATISM
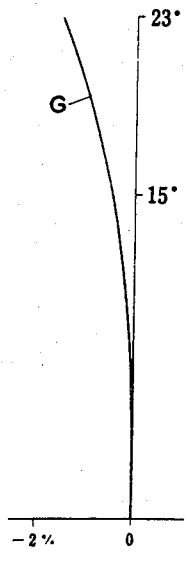
FIG. 4
DISTORTION
INVENTOR.
JIRO MUKAI
BY
ATTORNEY

United States Patent Office 2,826,116
Patented Mar. 11, 1958

2,826,116

PHOTOGRAPHIC OBJECTIVE CONSISTING OF FIVE LENS ELEMENTS

Jiro Mukai, Musashino City, Tokyo, Japan, assignor to Canon Camera Company, Inc., Otaku, Tokyo, Japan, a corporation of Japan Application May 23, 1956, Serial No. 586,745

Claims priority, application Japan May 24, 1955

2 Claims. (Cl. 88—57)

This invention relates to a modified embodiment of a Gauss-type lens which is generally used for photographic objectives. The object and characteristics of the invention are to substantially minimize coma, which is a defect of the Gauss-type lens, and effectively to correct other aberrations.

A clearer concept of the scope and purpose of this invention may be obtained from the following description, taken in connection with the attached drawing, in which:

Fig. 1 is a sectional view of a photographic objective for an embodiment according to this invention which has an image field of 46° and a relative aperture of F:2.8; and Figs. 2 to 4 show curves for spherical aberration, astigmatism and distortion aberration of the said lens.

This invention offers a photographic objective consisting of five lens elements that effectively utilizes air spaced lenses, or more particularly comprises each lens element being a single air-spaced meniscus type lens. The construction is such that inner lenses $L_3$ and $L_4$ are thin negative meniscus lenses positioned on either side of the diaphragm and are arranged with their strong concave surfaces towards the diaphragm, while the outer lenses $L_1$ and $L_5$ are positive meniscus type lenses, arranged towards the object and image sides respectively with their convex surfaces, and the second lens element $L_2$ is a positive meniscus lens arranged towards the object with its convex surface similarly as in the first lens element $L_1$ so as to be adjacent the first lens. And the following are the requirements which must be met by objectives of the instant invention, where $f$ is the focal length:

(1) The refractive index on the $d$-line of the spectrum of the all lens elements is in the range between 1.63 and 1.85;

(2)   $0.23\ f<r_3<0.40\ f,\ 0.14\ f<r_6<0.26\ f$
(3)   $0.005\ f<d_4<0.035\ f,\ 0.16\ f<d_6<0.2\ f$
(4)   $0.228\ f<|r_7|<0.35\ f,\ 0.32\ f<|r_8|<0.45\ f$
(5)   $0.014\ f<d_7<0.05\ f,\ 0.07\ f<d_9<0.13\ f$
(6)   $0.4\ f<r_4<0.8\ f,\ 0.5\ f<r_5<1.2\ f$
(7)   $0.024\ f<d_1<0.07\ f$ where $d_{\text{subscript}}$ is the distance along the optical axis, and $r_{\text{subscript}}$ is the radius of curvature of the successive lens surfaces in the direction from the object to the image side of the array.

An embodiment according to this invention is given below, where $N_d$ is the refractive index on the $d$-line; V is Abbe's dispersion ratio and $L_{\text{subscript}}$ is the number of the lens from the object side of the objective.

[$f=1$. $2\alpha=46°$. $F=2.8$.]

| Lens | Radius | Distance | $N_d$ | V |
|---|---|---|---|---|
| $L_1$ | $r_1 = 0.448$ | $d_1=0.040$ | 1.6584 | 50.8 |
|       | $r_2 = 1.425$ | $d_2=0.003$ |        |      |
| $L_2$ | $r_3 = 0.314$ | $d_3=0.074$ | 1.6676 | 41.9 |
|       | $r_4 = 0.638$ | $d_4=0.026$ |        |      |
| $L_3$ | $r_5 = 0.849$ | $d_5=0.027$ | 1.7400 | 28.2 |
|       | $r_6 = 0.201$ | $d_6=0.181$ |        |      |
| $L_4$ | $r_7 = -0.239$ | $d_7=0.019$ | 1.6645 | 35.9 |
|       | $r_8 = -0.368$ | $d_8=0.003$ |        |      |
| $L_5$ | $r_9 = -3.551$ | $d_9=0.096$ | 1.6935 | 53.5 |
|       | $r_{10} = -0.328$ |        |        |      |

When the above conditions are satisfied, each aberration is markedly corrected. Particularly comatic aberration which is a common defect in objectives of this type is considerably minimized so that a photographic objective to take a sharp image of picture can be constructed. That is, by utilizing the instant array of air-spaced lenses of which lenses the refractive index lies in the range between 1.63 and 1.85, and spacing $L_2$ from $L_3$, spherical aberration and zonal aberration are corrected as shown in Fig. 2. Graph A is the spherical aberration of objectives of the instant invention on the spectrum $d$-line, graph B the deviation from the sine condition of the $d$-line, graph C the spherical aberration on the spectrum $g$-line, and graph D the deviation of the $g$-line from the sine condition, the ordinates representing relative apertures and the abscissa distances compared to the focal length, as customary in such graphs. Furthermore the image surface can be made remarkably flat by making the curvatures of the rear surface of lens $L_2$ and of the front surface of lens $L_3$ respectively $0.23\ f<r_3<0.40\ f$ and $0.14\ f<r_6<0.26\ f$ and also shaping the lens element $L_4$ so that $0.014\ f<d_7<0.05\ f$, $0.228\ f<|r_7|<0.35\ f$, $0.32\ f<|r_8|<0.45\ f$, as illustrated in Fig. 3 in which graph E shows the sagittal image curvature and graph F the meridional image curvature. It should be noted also that remarkably effective correction of comatic aberration can be attained by making $0.16\ f<d_6<0.2\ f$ as the air-space containing the diaphragm. The distortion in objectives according to the instant invention is shown by graph G of Figure 4.

What I claim is:

1. Photographic objectives of the modified Gauss type comprising five air spaced meniscus lenses of optical glass having $d$-line refractive indices of from 1.63 to 1.85, the lenses have radii of curvature $r_{\text{subscript}}$ and being spaced distances $d_{\text{subscript}}$, the individual subscripts increasing from the object to the image side of the objective, which meet the following requirements:

$0.23\ f<r_3<0.4\ f,\ 0.14\ f<r_6<0.26\ f$
$0.005\ f<d_4<0.035\ f,\ 0.16\ f<d_6<0.2\ f$
$0.228\ f<|r_7|<0.35\ f,\ 0.32\ f<|r_8|<0.45\ f$
$0.014\ f<d_7<0.05\ f,\ 0.07\ f<d_9<0.13\ f$
$0.4\ f<r_4<0.8\ f,\ 0.5\ f<r_5<1.2\ f$
$0.024\ f<d_1<0.07\ f$ the first lens $L_1$ and the second lens $L_2$ being positive lenses with their surfaces of the greater convexity facing the object, the third lens $L_3$ a negative lens with its surface of the greater concavity facing the diaphragm, the fourth lens $L_4$ a thin negative lens with its surface of the greater concavity facing the diaphragm, and the fifth lens $L_5$ being a thick positive lens with its strong convex surface facing the image.

2. A photographic objective the objective of the modified Gauss type comprising five meniscus lenses air spaced from each other of which the first lens $L_1$ and the second lens $L_2$ are each a positive meniscus lens with their convex surfaces toward the object side of the objective, the third lens $L_3$ is a negative lens with its more concave surface towards the diaphragm, the fourth lens $L_4$ is a negative lens with its stronger concave surfaces towards the diaphragm, and the fifth lens $L_5$ is a thick lens with its more convex surface toward the image side of the objective, of which lenses the radii of curvature of the surfaces, $r_{subscript}$, the thickness of each lens at the optical axis and the air spacing between the successive lenses at such axis, $d_{subscript}$, the subscripts increasing in the direction from the object to the image side of the objective, the indices of refraction at the $d$-line of the material of the lenses, $Nd$, and the Abbe's number, V, being as follows:

[$f=1$.  $2\alpha=46°$.  $F=2.8$.]

| Lens | Radius | Distance | Refractive Index $N_d$ | Abbe's Number V |
|---|---|---|---|---|
| $L_1$ | $r_1 = 0.448$ | $d_1=0.040$ | 1.6584 | 50.8 |
|  | $r_2 = 1.425$ | $d_2=0.003$ |  |  |
| $L_2$ | $r_3 = 0.314$ | $d_3=0.074$ | 1.6676 | 41.9 |
|  | $r_4 = 0.638$ | $d_4=0.026$ |  |  |
| $L_3$ | $r_5 = 0.849$ | $d_5=0.027$ | 1.7400 | 28.2 |
|  | $r_6 = 0.201$ | $d_6=0.181$ |  |  |
| $L_4$ | $r_7 = -0.239$ | $d_7=0.019$ | 1.6645 | 35.9 |
|  | $r_8 = -0.368$ | $d_8=0.003$ |  |  |
| $L_5$ | $r_9 = -3.551$ | $d_9=0.096$ | 1.6935 | 53.5 |
|  | $r_{10} = -0.328$ |  |  |  |

References Cited in the file of this patent

UNITED STATES PATENTS

| | | |
|---|---|---|
| 2,649,023 | Tronnier | Aug. 18, 1953 |
| 2,677,989 | Tronnier | May 11, 1954 |
| 2,683,398 | Klemt et al. | July 13, 1954 |
| 2,720,139 | Tronnier | Oct. 11, 1955 |
| 2,724,994 | Lange | Nov. 29, 1955 |